(12) United States Patent
Baker et al.

(10) Patent No.: US 6,276,972 B1
(45) Date of Patent: Aug. 21, 2001

(54) CABLE COVER

(75) Inventors: Frank P. Baker, Chatham; Theodore A. Conorich, Parsippany Township, Morris County; Jeff S. Kiersh, Glen Gardner; William J. Ivan, Woodbridge, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/575,788

(22) Filed: May 22, 2000

Related U.S. Application Data

(63) Continuation-in-part of application No. 09/330,120, filed on Jun. 10, 1999.
(60) Provisional application No. 60/129,561, filed on Apr. 16, 1999.

(51) Int. Cl.[7] ....................................................... H01R 9/22
(52) U.S. Cl. ........................................... 439/718; 439/491
(58) Field of Search .................................... 439/491, 709, 439/715, 718, 719; 174/138 F

(56) References Cited

U.S. PATENT DOCUMENTS

| 4,911,661 | * | 3/1990 | Neuwirth | 439/718 |
| 5,391,834 | * | 2/1995 | Place | 361/622 |
| 5,576,516 | * | 11/1996 | Kameyama et al. | 439/522 |
| 5,804,770 | * | 9/1998 | Tanaka | 174/138 F |

\* cited by examiner

Primary Examiner—Khiem Nguyen
(74) Attorney, Agent, or Firm—Gibbons, Del Deo, Dolan, Griffinger & Vecchione

(57) ABSTRACT

A protective cable cover separates cable routing from patchcords and cross-connect wire in a wiring trough. The cable cover is placed over the cable conductors on a wiring block cable organizer. The cable cover may be removed to allow for the addition or replacement of building cables without having to remove any adjacent patchcords. A circuit designation strip and row marking pads are provided to designate rows and circuit connections. A strike engages a latch on a patchcord plug to releasably retain the plug in engagement with the connecting block. Mounting holes are formed integral with the cable cover to engage latches on the cable organizer for releasably mounting the cable cover on the cable organizer.

15 Claims, 13 Drawing Sheets

CABLE COVER

CROSS REFERENCE TO RELATED APPLICATIONS

This application is a Continuation-in Part of co-pending U.S. patent application Ser. No. 09/330,120 entitled "Cable Cover" filed on Jun. 10, 1999 which claims the benefit of U.S. Provisional Application Ser. No. 60/129,561, filed on Apr. 16, 1999. This application is related to co-pending application Ser. No. 09/329,573 entitled "Twenty Eight Pair Cabling System" filed on Jun. 10, 1999, co-pending application Ser. No. 09/329,438 entitled "Cable Organizer With Conductor Termination Array" filed on Jun. 10, 1999, and co-pending application Ser. No. 09/329,444 entitled "Printed Wiring Board Cable Cover" filed on Jun. 10, 1999.

FIELD OF THE INVENTION

This invention relates generally to the field of telecommunications, and more particularly to connectors for use in telecommunication system cabling.

BACKGROUND OF THE INVENTION

The telecommunications and data management industries utilize connective hardware for general building wiring, premises distribution systems, local area networks, and other network applications. The connective hardware known as the 110 Connector System has become a standard of the industry because of the reliable gas-tight connection provided by the 110 Insulation Displacement Connector. This miniature quick-connect terminating system is listed or approved by Underwriters Laboratories, the Canadian Standards Association, and the Australian Standards Association. The 110 Connector Systems have gained type approval from such countries as the United Kingdom, Japan, Korea, and others.

The 110 Connector System consists of field-wired cable termination apparatus that is used to organize and administer cable and wiring installations. The main cross-connect is typically located in the equipment room and provides termination and cross-connection of network interface equipment, switching equipment, processor equipment, and backbone (riser or campus) wiring. The horizontal cross-connect is typically located in the telecommunications closet and provides termination and cross-connection of horizontal (to the work area) and backbone wiring. Cross-connects provide efficient and convenient routing and rerouting of common equipment circuits to various parts of a building or campus.

The 110 Connector Systems enable cable and wiring installations to be handled by technical or non-technical end user personnel. Line moves and rearrangement for the cabling terminated at a cross connect can be performed with patchcords (plug-ended jumpers) or cross-connect wire. The patchcords are used where the highest system integrity is required.

Referring now to FIGS. 1, 2, and 3, the prior art 110 Connector System 110 was designed to have its connector ports 15 arranged in horizontal rows in uniformly spaced conductor termination arrays (index strips). FIG. 1 shows four rows of index strips 14 mounted in a typical wiring block 12. The spaces between these index strips become troughs, and are alternately dedicated as either cable routing troughs 16 or cross-connect wire routing troughs 18 and 19.

Unsheathed cable conductors 20 are routed through the cable troughs 16 to their appropriate termination ports in the index strips 14. All cable sheaths stop at the entrance to the cable troughs 16. Each cable trough 16 feeds conductors to the two index strips that form its sides.

Connecting blocks 22, each containing several contact elements 24 in pairs, are placed over the index strips 14 and make electrical connections to the cable conductors 20. These connecting blocks 22 also form the side walls of the troughs 16 and 18. A designation strip 26 is placed within the cable trough 16, near the top of the connecting blocks 22. This strip 26 extends the full length of the cable trough 16, covering the cable conductors 20, and allows the cable connector ports 15 to be visibly labeled as an indication of where the other end of the cables are attached. A pair of row marking surfaces 27 are provided to label each row.

Cross-connect wire (not shown) or patch cords 28 are terminated in the ports 25 on the top of the connecting blocks 22. Cross-connect wires, when used, are routed to their appropriate ports 25 through the cross-connect troughs 18 between the cable troughs 16 or the troughs 19 along the outside edges of wiring block 12. The connecting blocks 22 form the separator between cable conductors 20 and cross-connect conductors. When patch cords 28 are used, the cross-connect troughs 18 and 19 remain empty.

The 110 patchcords 28 are available now in two versions. The old version is a forward-engaging patchcord 28 that uses a forward-engaging plug 30 as shown in FIG. 1. The patchcord 28 projects outward from the connecting block 22, is routed through ducts 32, backboards 34, and troughs 36 to another connecting block 22, as shown in FIG. 3.

The new version patchcord that uses a reverse-engaging plug is further described in U.S. Pat. No. 5,718,604 entitled Patch Cord Connection System issued on Feb. 17, 1998 and is incorporated herein by reference.

SUMMARY OF THE INVENTION

In accordance with the present invention, there is provided a cable cover, for use in connection with a cable organizer, cable conductors, a connecting block, and a patchcord plug. The cable cover comprises a plate having two halves and front and rear surfaces extending between opposite upper and lower edges, and between opposite first and second ends. A hinge connects the two plate halves. The plate rear surface is juxtaposed with the cable organizer to protect the cable conductors. Mounting means is provided for releasably mounting the cable cover on the cable organizer. The present invention allows for the cover plate to be removed from a connecting block without disturbing the patchcords already installed.

BRIEF DESCRIPTION OF THE DRAWING

A more complete understanding of the present invention may be obtained from consideration of the following description in conjunction with the drawing, in which.

DESCRIPTION OF THE PREFERRED EMBODIMENTS

Figure 5A:
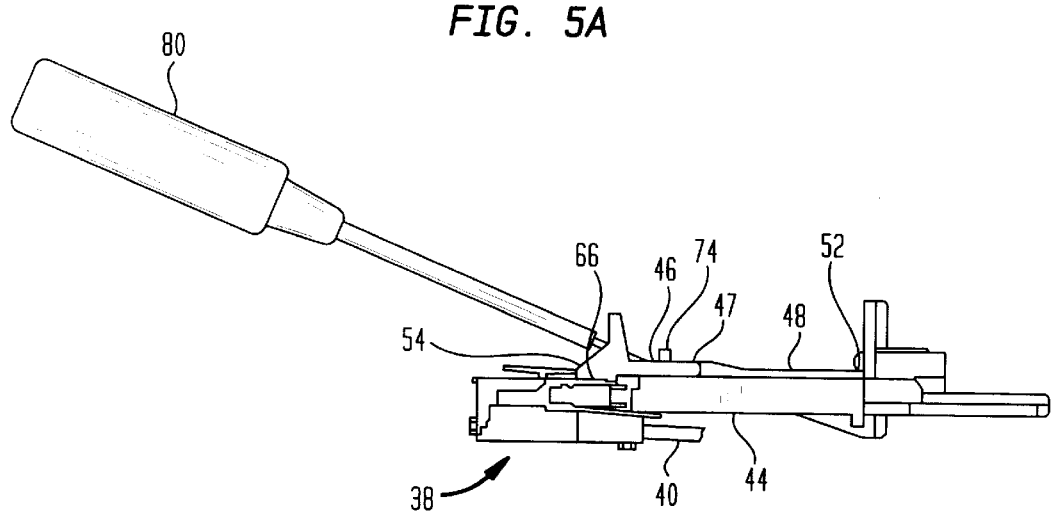
FIGS. 5a and 5b are side plan views of the cable cover, cable organizer, connecting block and a rearward engaging patchcord plug.
Figure 5B:
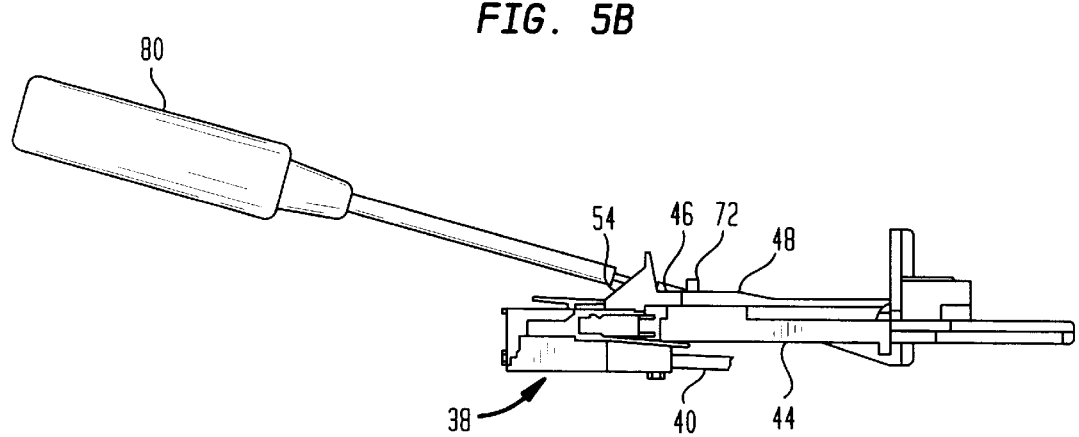
Figure 8A:
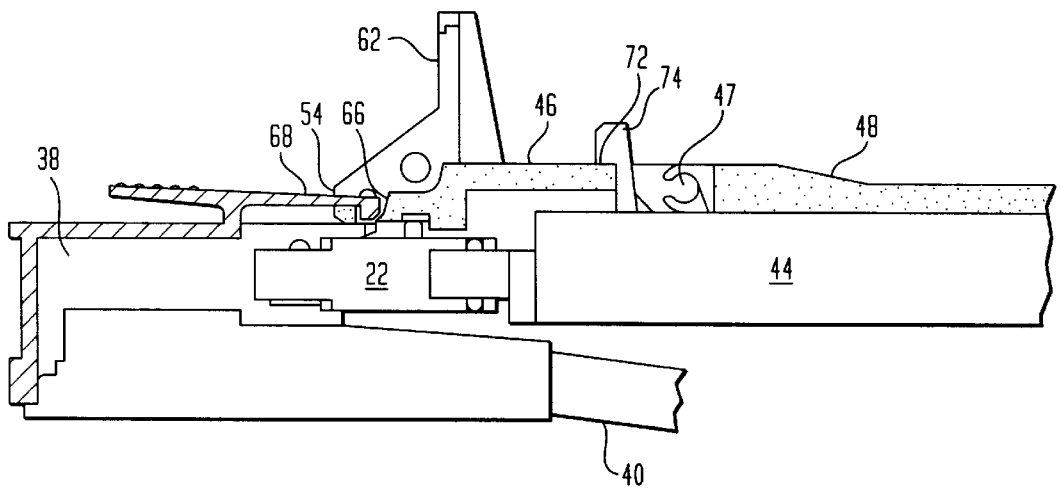
FIGS. 8a and 8b are blown up side plan views of the cable cover, cable organizer, connecting block and a rearward engaging patchcord plug.
Figure 8B:
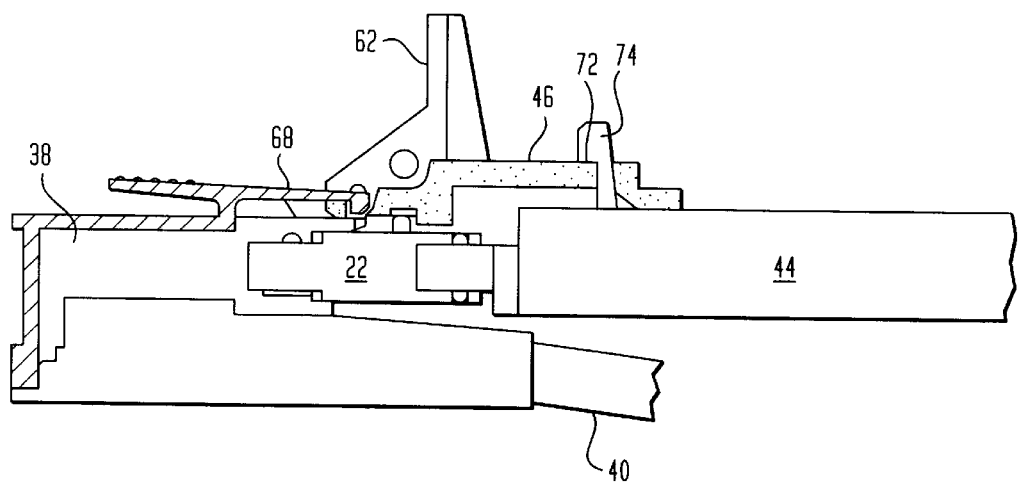

Referring to FIG. 5a there is shown a side plan view of the cable cover and connecting block and FIG. 8a there is shown is a blown up side plan view of the cable cover and connecting block wherein similar elements are numbered the same. It can be seen that the new patchcord 40 with patch cord plug 38 projects inward. Every trough now potentially carries three types of conductors: patchcords 40 (including those with a reverse-engaging plug 38), cable conductors, and cross-connect conductors. Consequently, the troughs are crowded, making the conductors difficult to trace. The crowding of unsheathed cable conductors can result in cross-talk and other electrical problems, and, the new reverse-engaging patchcord plug 38 can snag on wiring while being pulled out. Partly in order to address these problems, the wiring block has index strips that are elevated upon a cable organizer and set wider apart to enlarge the troughs. Channels direct the cable conductors across the cable organizer front surface toward the termination array. The cable conductors are sheathed up to the termination array, helping to organize the cable conductors, reduce cross-talk, and improve electrical performance. A cable cover 42 encloses the cable conductors. In addition, the cable cover is hinged allowing for the addition and/or removal of cables to the wiring block without disturbing other patchcords that are already in place. Referring to FIG. 5b there is shown a side plan view of another embodiment of the cable cover and connecting block and FIG. 8b there is shown is a blown up side plan view of another embodiment of the cable cover and connecting block wherein similar elements are numbered the same, which corresponds to FIG. 5b.

Figure 1:
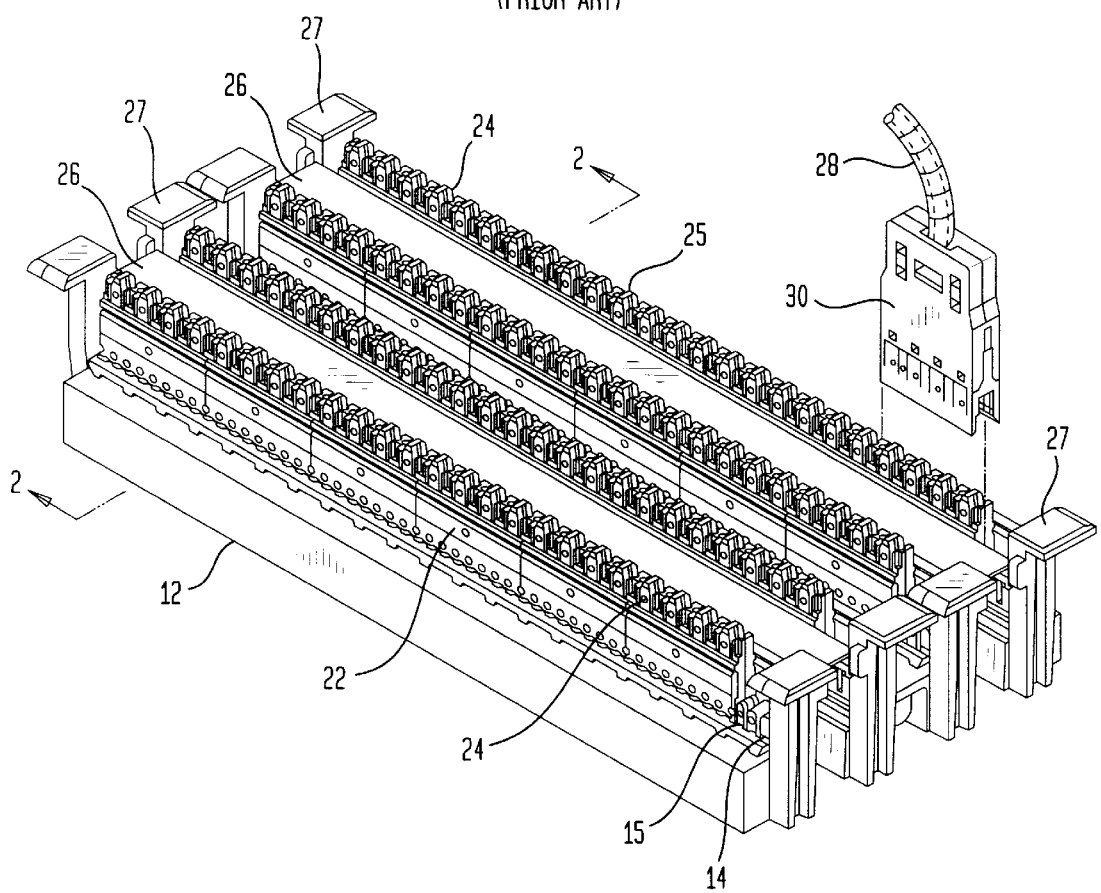
FIG. 1 is a perspective view of a prior art wiring block, including connection blocks and a forward-engaging patchcord plug.
Figure 2:
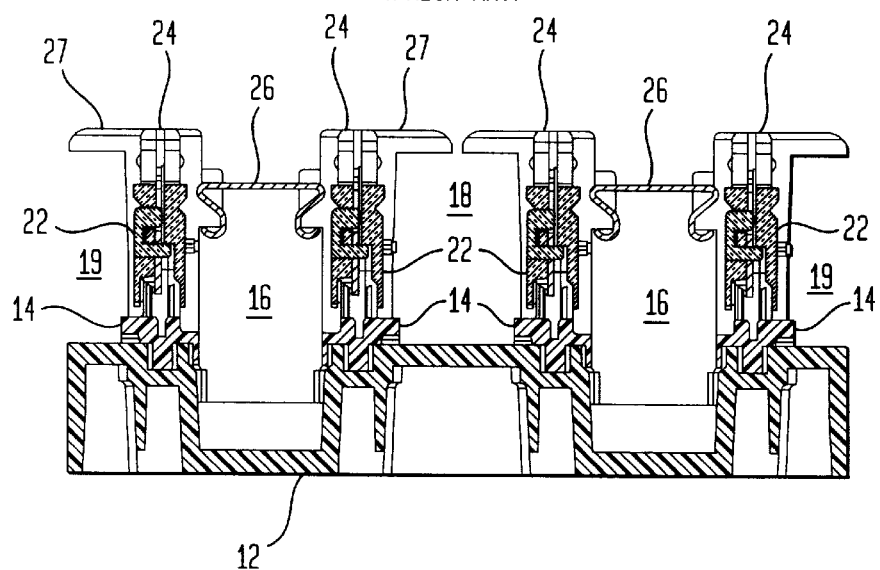
FIG. 2 is a cross-sectional view of the prior art wiring block of FIG. 1, taken along lines 2—2 of FIG. 1.
Figure 3:
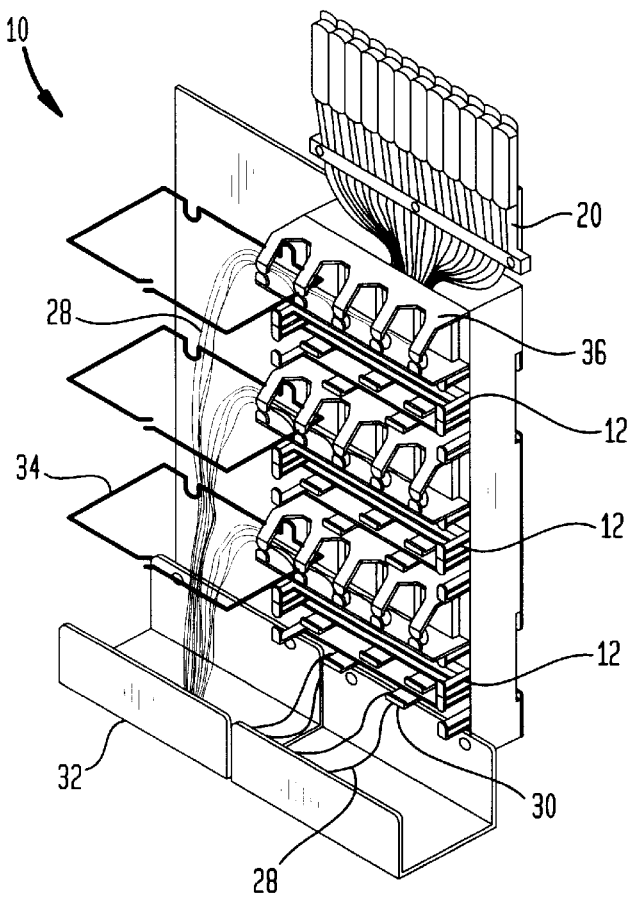
FIG. 3 is a perspective view of a prior art 110 Connector System, showing the prior art wiring block, patchcords and troughs.
Figure 4A:
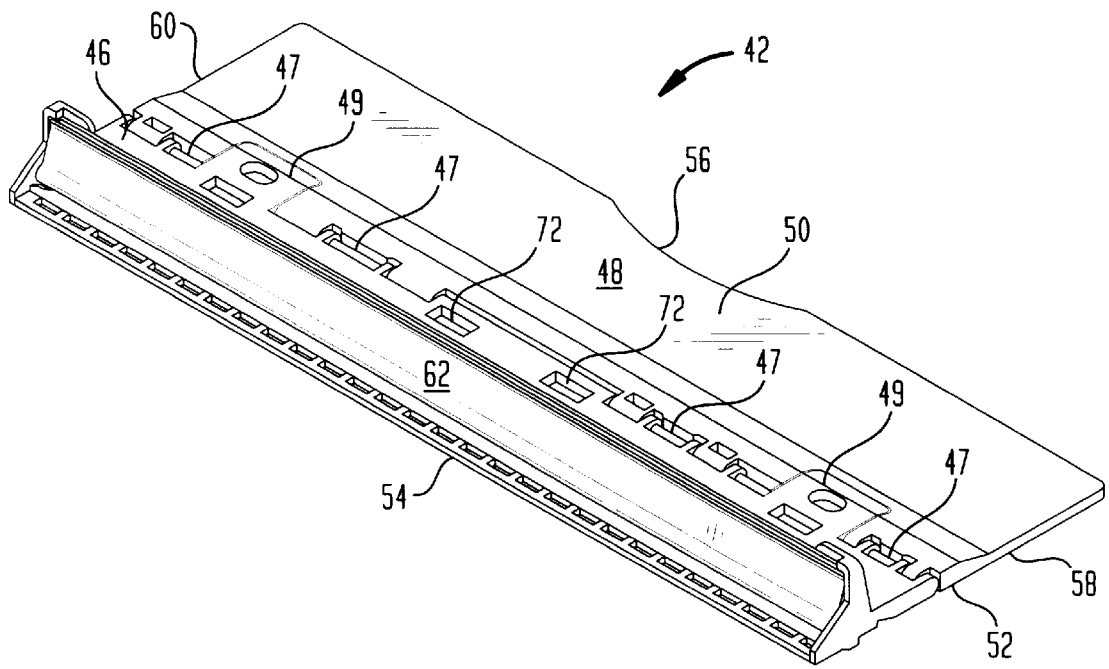
FIG. 4a is a perspective view of a cable cover constructed in accordance with the invention having a barrel hinge.
Figure 4B:
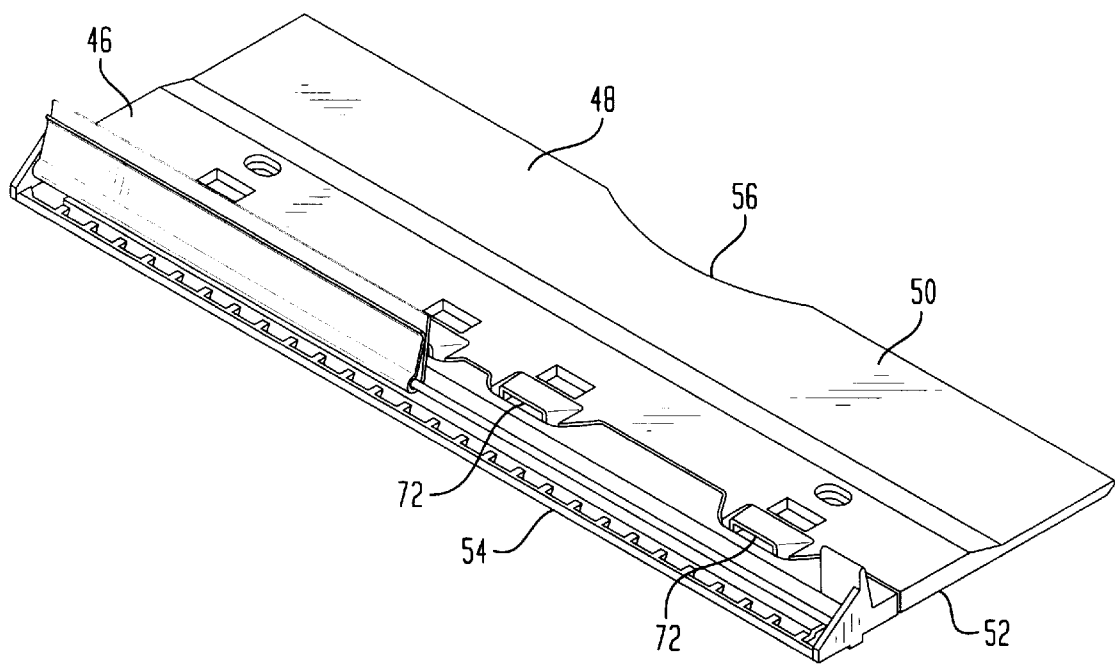
FIG. 4b is a perspective view of another cable cover constructed in accordance with a the invention.
Figure 6A:
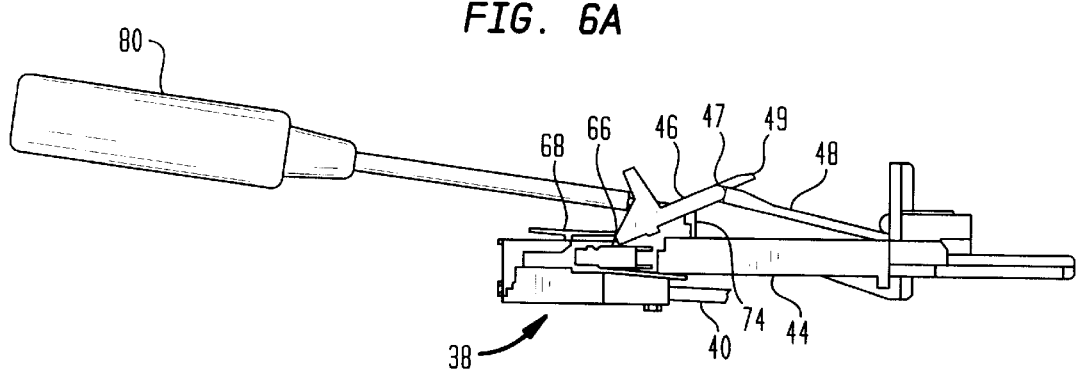
FIGS. 6a and 6b are side plan views of the cable cover, cable organizer, connecting block and a rearward engaging patchcord plug in operation.
Figure 7A:
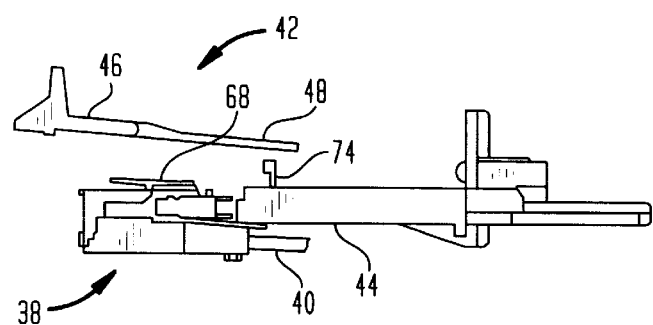
FIGS. 7a, 7b, and 7c are side plan views of the cable cover removed from the cable organizer assembly.
Figure 6B:
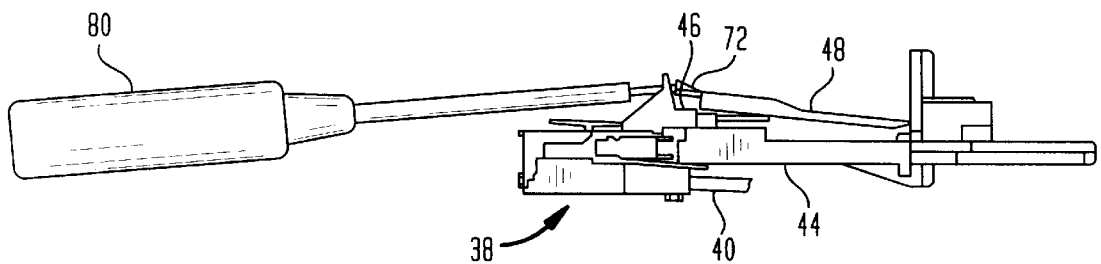
Figure 7B:
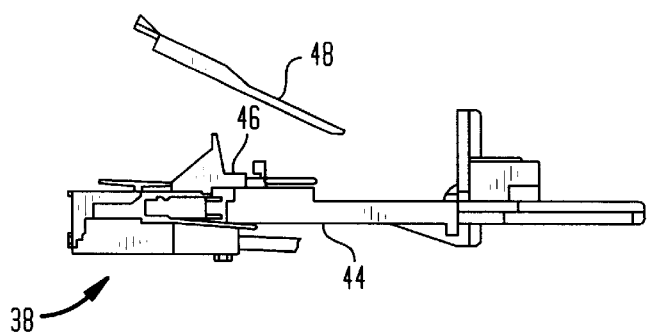
Figure 7C:
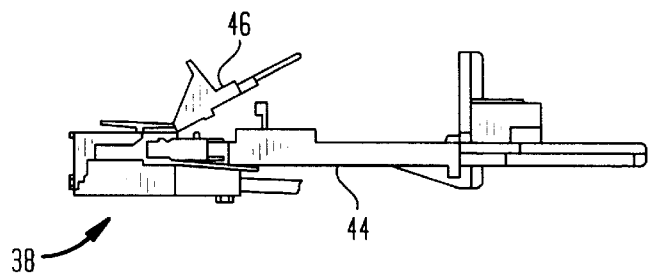
Figure 9A:
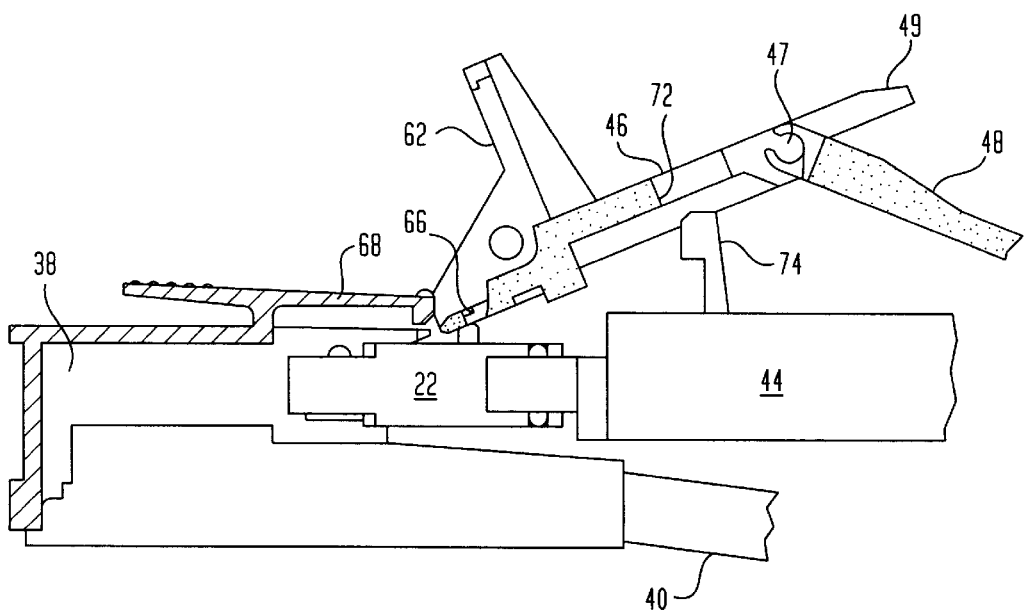
FIGS. 9a and 9b are blown up side plan views of the cable cover and connecting block in operation.
Figure 9B:
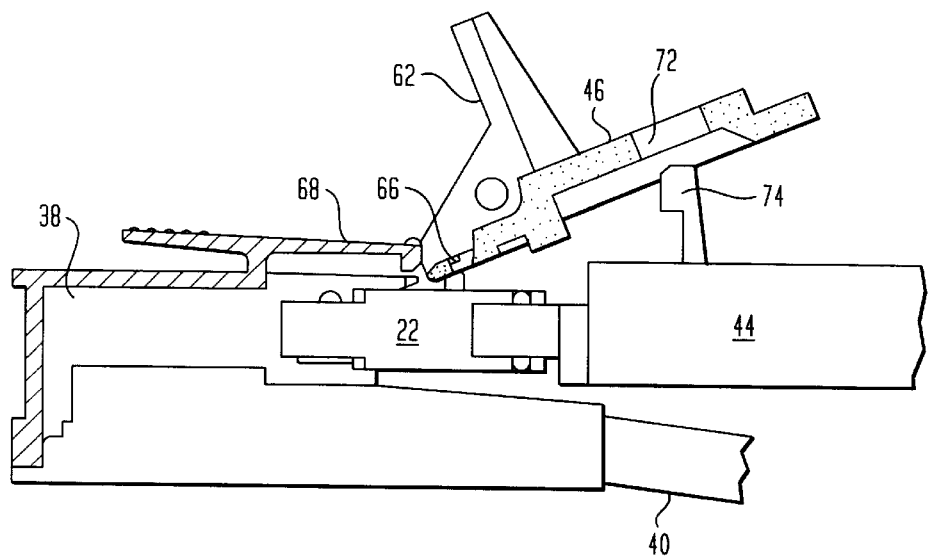
Figure 10A:
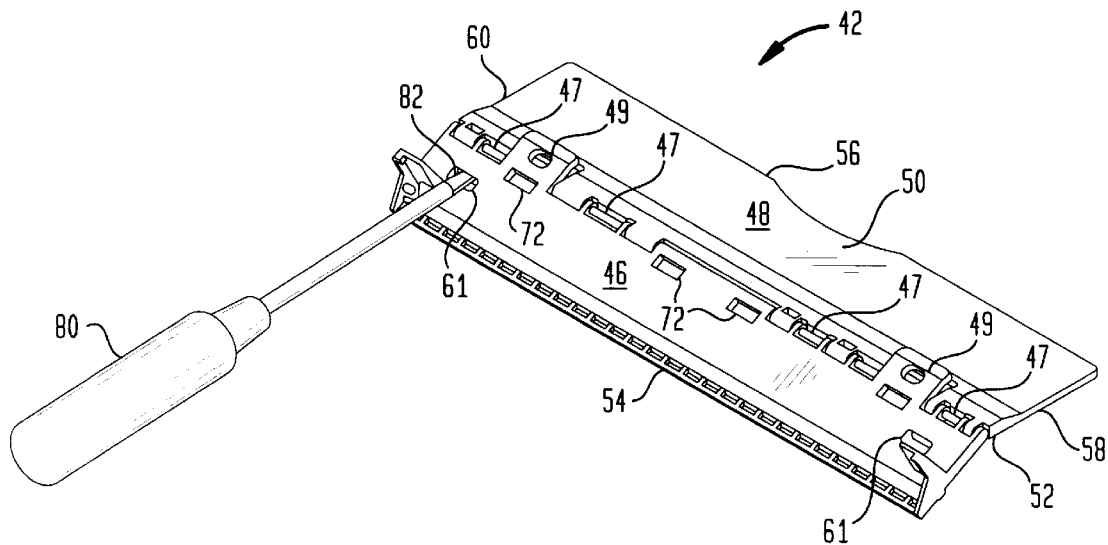
FIG. 10a is a perspective view of the cable cover of FIG. 4a in operation.
Figure 10B:
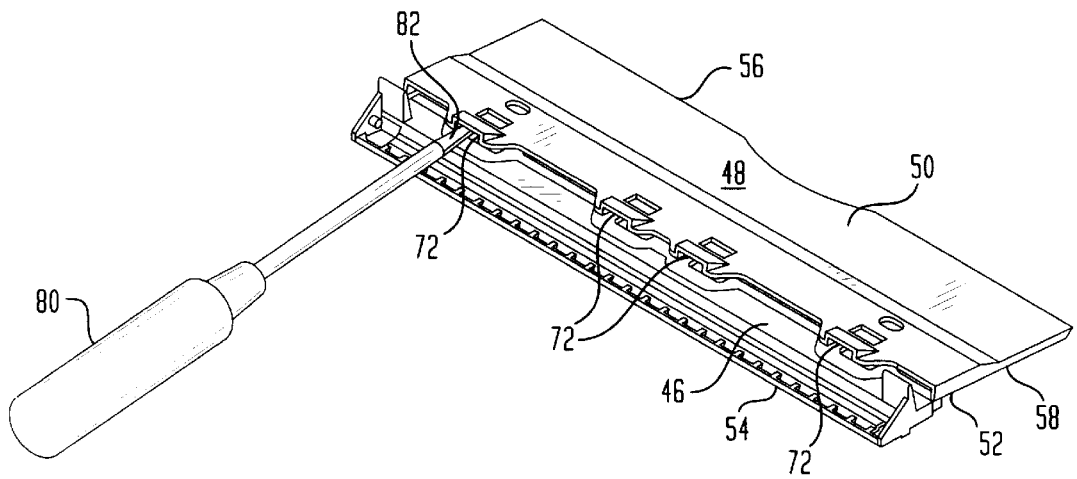
FIGS. 10b and 10c are perspective views of the cable cover of FIG. 4b in operation.
Figure 10C:
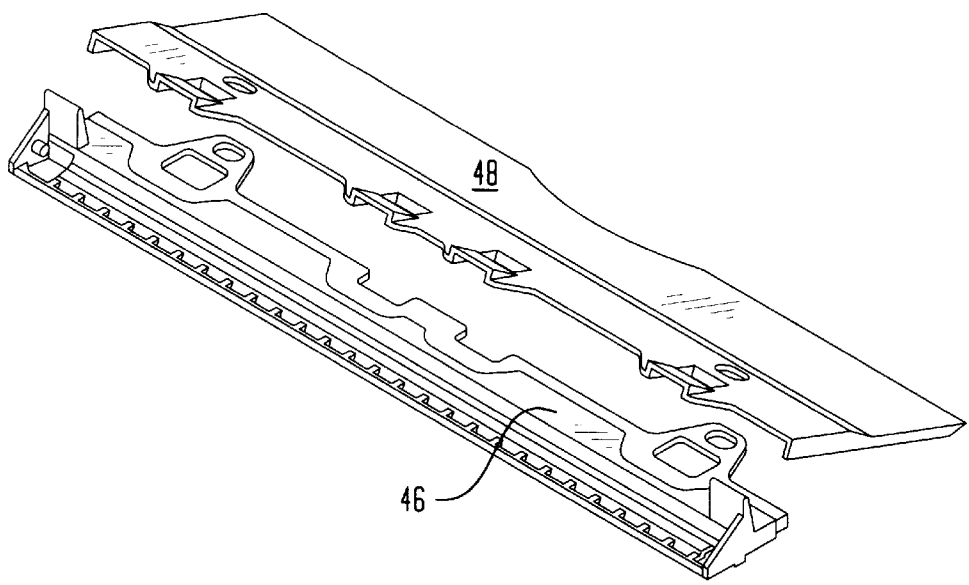
Figure 11:
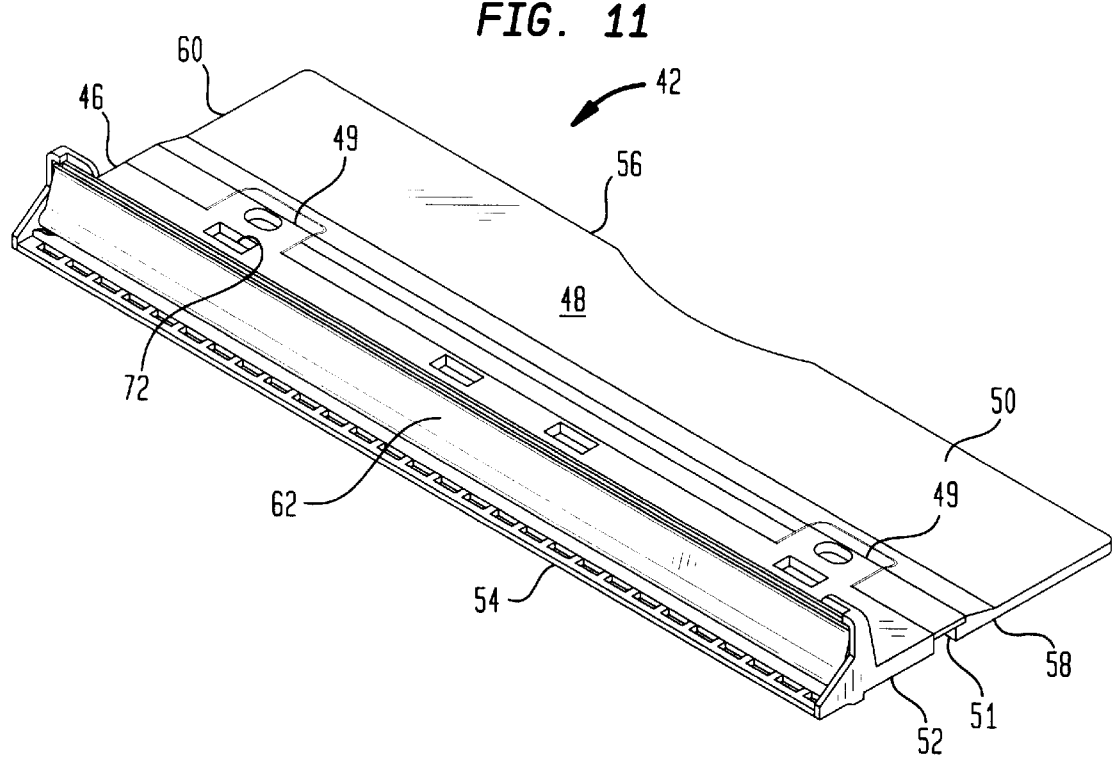
FIG. 11 is a perspective view of a cable cover constructed in accordance with the invention having a living hinge.

In FIG. 4a there is shown a perspective view of a cable cover constructed in accordance with the invention having a barrel hinge. In FIG. 4a there is shown a perspective view partial cut away of another embodiment of a cable cover constructed in accordance with the invention having a front portion removable from a rear portion. In FIGS. 6a and 6b there are shown side plan views of the cable cover in operation as it is being disengaged from the cable organizer 44 and patchcord plug 38. In FIG. 7a there is shown a side plan view of the cable cover removed from the cable organizer. In FIGS. 7b and 7c there are shown a side plan view of the cable cover removed from the cable organizer in two steps. In FIGS. 9a and 9b there are shown a blown up side plan views of the cable cover in operation. Referring to FIGS. 4a, 4b, 6a, 6b, 7a, 7b, 7c, 9a and 9b and referring back to FIGS. 5a, 5b, 8a and 8b a cable cover 42 is provided in connection with a cable organizer 44, and a patchcord plug 38 wherein similar elements are numbered the same. The cable cover 42 comprises a front portion 46 and a rear portion 48. The front portion 46 and the rear portion 48 are connected by a hinge mechanism. Specifically, at least two and preferably several barrel hinges 47 connect the first half 46 to the second half 48, enabling the front portion 46 to rotate with respect to the rear portion 48. Alternatively, a living hinge 51 (flexible material) may be used as shown in FIG. 11. Locking tabs 49 extend from the first half 46. The cable cover 42 also has top 50 and bottom 52 surfaces extending between opposite front 54 and rear 56 edges, and between opposite first 58 and second 60 ends. The plate bottom surface 52 is juxtaposed with the cable organizer 44 to protect the cables (not shown). The top surface 50 of the front portion 46 define at least one and preferably several slots 61 and 72.

Recording means is provided for recording indicia on the cable cover 42 to designate rows and circuit connections. Specifically, a circuit designation strip 62 is disposed along the plate front edge 54.

Patchcord strike 66 projects transversely outward from the plate bottom surface 52 adjacent the plate front edge 54 for retaining the patchcord plug 38 in engagement with the connecting block 22. Thus, the front patchcord strike 66 engages a latch 68 to releasably retain the patchcord plug 38 in engagement with the connecting block 22.

Mounting means is provided for releasably mounting the cable cover 42 on the cable organizer 44. Typically, at least one, and preferably several, holes defining mounting strikes 72 are formed integral with the front portion 46. The mounting strikes 72 engage with cable organizer latches 74 on the cable organizer 44.

The cover 42 is in place as shown in FIGS. 5a, 5b, 8a and 8b protecting the cables in cable organizer 44 and providing labeling on the circuit designation strip 62. The cover 42 may be removed in order to add or repair building cables to the cable organizer 44, without disturbing already connected patchcord plugs 38. A tool 80 having a flat head 82 such as a screwdriver is inserted into the slot 61. The tool 80 rotates the front portion 46 approximately 45 degrees forcing the cable organizer latch 74 and the patchcord latch 68 to disengage. The barrel hinge 47 rotates the rear portion 48 simultaneously, while the locking tabs 49 extend straight back from the front portion 46. The front portion 46 is then rotated rear forcing the locking tabs 49 to lock the front portion 46 and second half 48 in their original straight position as shown in FIG. 7a. The cover 42 is then removed from the cable organizer 44 allowing cables to be added or removed.

Figure 12:
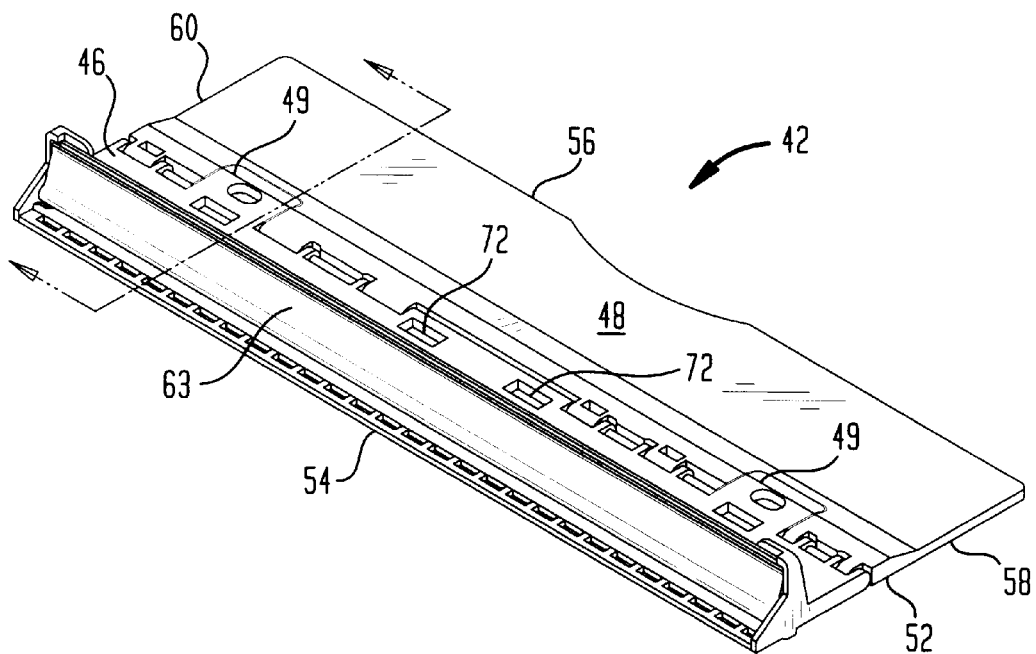
FIG. 12 is perspective view of the cable cover having a hinged label surface in the up position.
Figure 13:
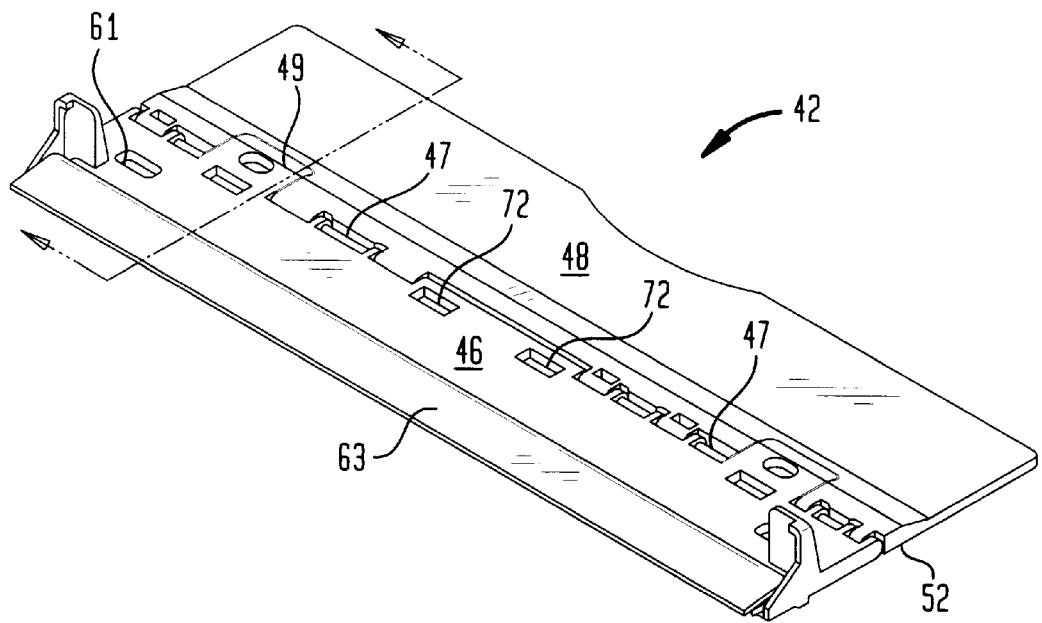
FIG. 13 is perspective view of the cable cover having a hinged label surface in the down position.
Figure 14:
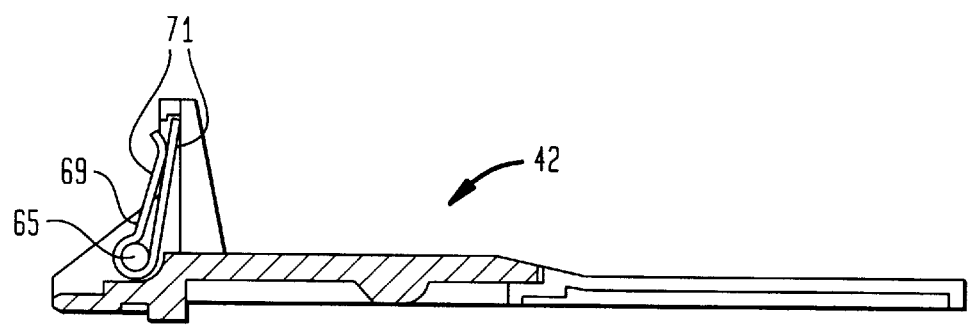
FIG. 14 is side view of the cable cover of FIG. 12 taken at line A—A.
Figure 15:
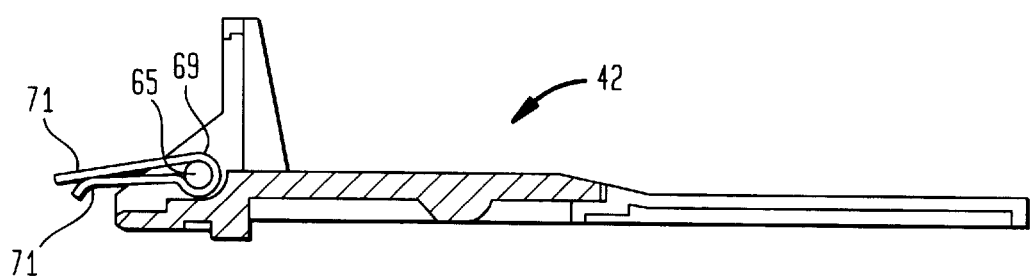
FIG. 15 is side view of the cable cover of FIG. 13 taken at line B—B.

In FIG. 12 there is shown a perspective view of the cable cover having a hinged label surface in the up position. In FIG. 13 there is shown a perspective view of the cable cover having a hinged label surface in the down position. In FIG. 14 is side view of the cable cover of FIG. 12 taken at line A—A. In FIG. 15 is side view of the cable cover of FIG. 13 taken at line B—B. Referring to FIGS. 12, 13, 14 and 15 wherein similar elements are numbered the same, there is shown another embodiment of the cover 42 having a hinged designation surface 63. A hinge pin 65 is mated with corresponding hinged element 69 that are molded to the cable cover 42. The hinged element 69 may hold designation labeling (not shown) between the two arms 71 of the hinged element 69. While in the down position, as shown in FIG. 13, additional room is provided for easier manipulation of the patchcord plugs 38.

Figure 16:
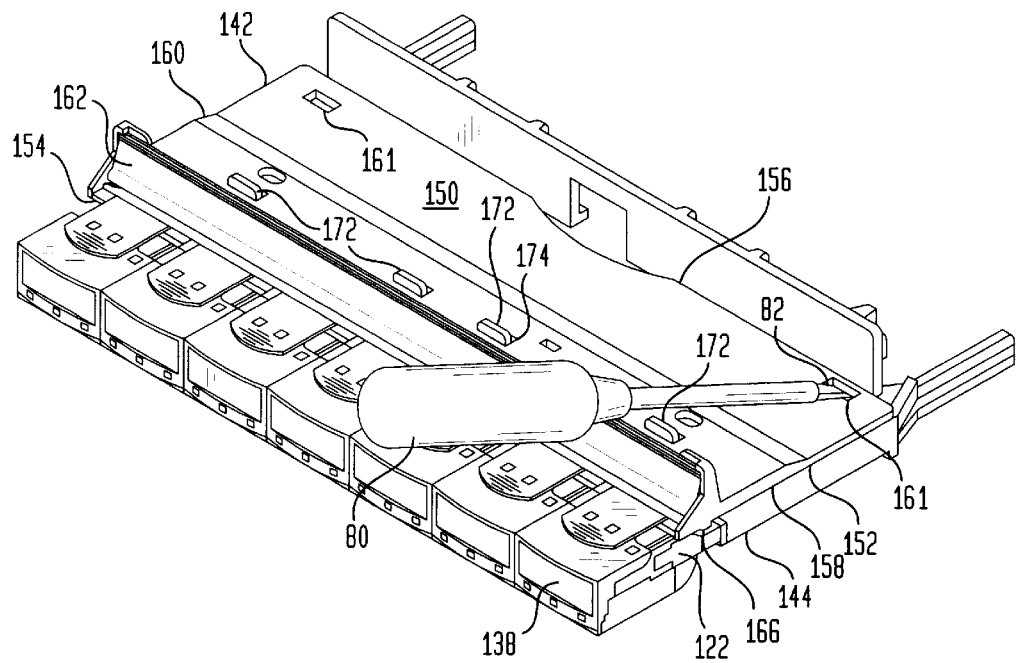
FIG. 16 is a perspective view of a second embodiment of the cable cover, cable organizer, patchcord and connecting block.
Figure 17:
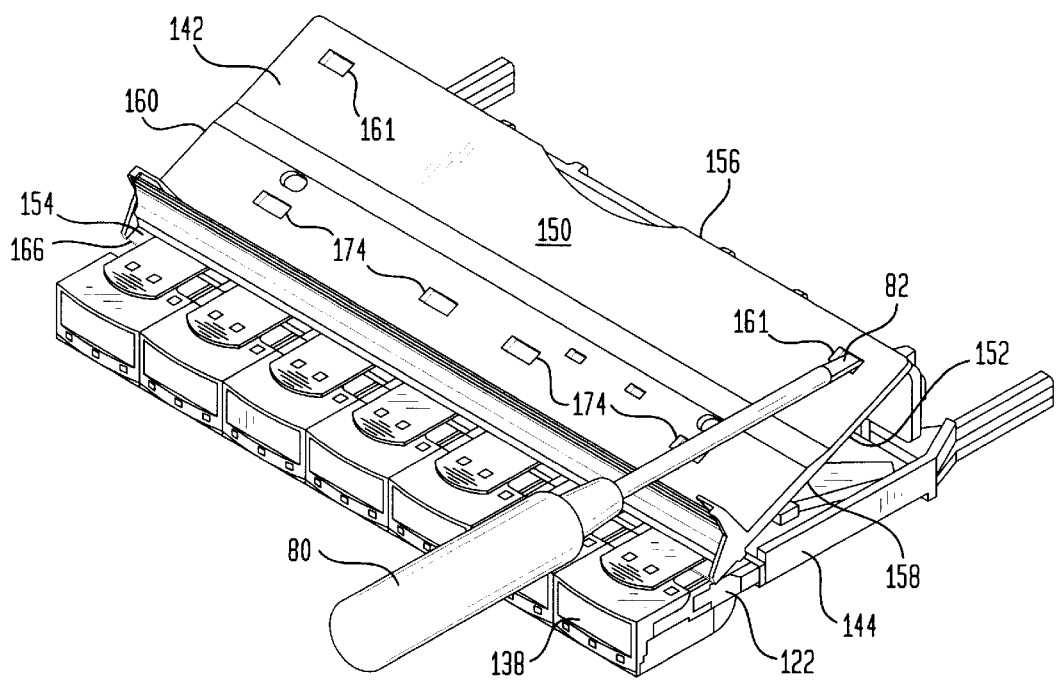
FIG. 17 is a perspective view of the cable cover of FIG. 16 in operation.

In FIG. 11 there is shown a perspective view of a second embodiment of the cable cover. Another embodiment of the cable cover can been seen by referring to FIGS. 16 and 17 wherein similar elements are numbered the same. In FIG. 17 there is shown a perspective view of the cable cover of FIG. 13 in operation. A cable cover 142 is provided in connection with a cable organizer 144, and a patchcord 138. The cable cover 142 has top 150 and bottom 152 surfaces extending between opposite front 154 and rear 156 edges, and between opposite first 158 and second 160 ends. The plate bottom surface 152 is juxtaposed with the cable organizer 144 to protect the cables (not shown). The top surface 150 defines at least one and preferably several slots 161.

Recording means is provided for recording indicia on the cable cover 142 to designate rows and circuit connections. Specifically, a circuit designation strip 162 is disposed along the plate front edge 154.

Patchcord retaining means is provided for retaining the patchcord plug 138 in engagement with the connecting block 122. Specifically, a patchcord strike 166 is attached to the plate rear surface 152 adjacent the plate upper edge 154. The patchcord strike 166 extends between the plate first 158 and second 160 ends, and is disposed generally parallel to the plate rear surface 156.

Mounting means is provided for releasably mounting the cable cover 142 on the cable organizer 144. Typically, at least one, and preferably several, holes defining mounting strikes 174 are formed integral with the plate 142. The mounting strikes 172 engage with latches 174 on the cable organizer 144.

In operation, the cover 142 is similar to the cover 42 as shown in FIGS. 5 and 7 protecting the cables and providing labeling on the circuit designation strip 162. The cover 142 may be removed to add cables to or remove cables, without disturbing already connected patchcords 138. A tool 80 having a flat head 82 such as a screwdriver is inserted into the slot 161. The tool 80 pries up the cover 142 forcing the cable organizer latch 172 to disengage. The cover 142 is then removed from the cable organizer 144 allowing cables to be added or removed.

Numerous modifications and alternative embodiments of the invention will be apparent to those skilled in the art in view of the foregoing description. In particular, the position of the hinges and the proportions of the front portion of the cover to the rear portion of the cover may be varied. A single piano style barrel hinge may also be used as well as other equally suitable hinges which are known to those skilled in the art. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which will come within the scope of the appended claims, is reserved.

What is claimed:

1. A cable cover, for use in connection with a cable organizer, cable conductors, and a patchcord, the cable cover comprising:

a plate having top and bottom surfaces extending between opposite front and rear edges, and between opposite first and second ends, the plate bottom surface being juxtaposed with the cable organizer to protect the cable conductors;

mounting device for releasably mounting the cable cover on the cable organizer;

patchcord retainer for retaining the patchcord plug in engagement with the connecting block; and wherein the cable cover and the cable organizer separate the cable conductors from the patchcord and the cable cover is releasable from the cable organizer without removing an adjacent patchcord plug in engagement with an adjacent connecting block.

2. The cable cover as recited in claim 1 further comprising recording means for recording indicia on the cable cover to designate rows and circuit connections.

3. The cable cover as recited in claim 1, wherein the plate further comprises:

a front portion defining at least one slot;

at least one locking tab extending from the front portion;

a rear portion; and the front portion rotatably connected to the rear portion, wherein a tool is inserted into the slot rotating the front portion enables the patchcord retainer and the mounting device to disengage and to rotate the rear portion simultaneously, then rotating the front portion back forcing the locking tabs to lock the front portion and the rear portion.

4. The cable cover as recited in claim 3 wherein the front portion is rotated approximately 45 degrees.

5. The cable cover as recited in claim 3, wherein the front portion is rotatably connected to the rear portion with at least one barrel hinge.

6. The cable cover as recited in claim 3 wherein the front portion is rotatably connected to the rear portion with a flexible material forming a living hinge.

7. The cable cover as recited in claim 1 further comprising at least one slot defined by the plate, wherein a tool inserted into the slot rotating the cover enables the patchcord retaining means and the mounting means to disengage.

8. The cable cover as recited in claim 2, wherein the recording means includes a circuit designation strip disposed along the plate upper edge.

9. The cable cover as recited in claim 8, wherein the recording means further comprises:

a hinged element having integral hinge sockets; and a hinge pin coupled to the cable cover, the hinged element pivoting on the hinge pin, wherein the hinged element hold designation labeling.

10. The cable cover as recited in claim 1, wherein the patchcord retainer further comprises a patchcord strike projecting outward from and generally parallel to the plate rear surface adjacent the plate upper edge, the patchcord strike having a plurality of spaced apart holes therethrough, the holes having edges defining a rear face for engagement with a latch on the patchcord plug.

11. The cable cover as recited in claim 1, wherein the mounting device further comprises at least one mounting strike integral with the plate for engagement with a latch on the cable organizer.

12. A cable cover, for use in connection with a cable organizer, cable conductors, and a patchcord, the cable cover comprising:
- a plate comprising:
  - front and rear surfaces extending between opposite upper and lower edges, and between opposite first and second ends, the plate rear surface being juxtaposed with the cable organizer to protect the cable conductors;
  - a front portion, the front portion defining at least one slot;
  - at least one locking tab extending from the front portion;
  - a rear portion; and
  - a hinge rotatably connecting the front portion and the rear portion,
  - wherein the plate has a slot to facilitate disengaging the cover from the cable organizer,
- mounting device for releasably mounting the cable cover on the cable organizer,
- patchcord retainer for retaining the patchcord plug in engagement with the connecting block, the patchcord retainer comprising:
  - a patchcord strike projecting outward from and generally parallel to the plate rear surface adjacent the plate upper edge,
  - a plurality of spaced apart holes defining on the patchcord strike,
  - the holes having edges defining a rear face for engagement with a latch on the patchcord plug; and
- recording means having a circuit designation strip disposed along the plate upper edge;
- wherein a tool is inserted into the slot rotating the front portion approximately 45 degrees enabling the patchcord retainer and the mounting device to disengage and the hinge to rotate the rear portion simultaneously, then rotating the front portion rear forcing the locking tabs to lock the front portion and the rear portion.

13. The cable cover of claim 12, wherein the recording means further includes:
- a hinge pin molded to the cable cover, and
- a hinge element having two arms,
- wherein the hinge element is adapted to rotate on the hinge pin and the hinge element is adapted to hold designation labeling between two arms.

14. A method for removing a cable cover used in connection with a cable organizer, cable conductors, and a patchcord, the method comprising the following steps:
- inserting a tool into a slot in the cable cover having a front portion and a rear portion;
- rotating the front portion enabling the patchcord retainer and the mounting device to disengage and the hinge to rotate the rear portion simultaneously; and
- rotating the front portion rear forcing the locking tabs to lock the front portion and the rear portion.

15. The method as recited in claim 14 wherein the step of rotating the front portion further comprises rotating the front portion approximately 45 degrees.

* * * * *